United States Patent

Fujimori et al.

Patent Number: 5,956,112
Date of Patent: *Sep. 21, 1999

[54] LIQUID CRYSTAL DISPLAY DEVICE AND METHOD FOR MANUFACTURING THE SAME

[75] Inventors: Kohichi Fujimori, Nabari; Tokihiko Shinomiya, Nara; Shuichi Kohzaki, Nara; Yutaka Ishii, Nara, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,894

[22] Filed: Oct. 1, 1996

[30] Foreign Application Priority Data

Oct. 2, 1995 [JP] Japan ..................... 7-255183
May 17, 1996 [JP] Japan ..................... 8-123638

[51] Int. Cl.⁶ ............... G02F 1/1339; G02F 1/1333; G02F 1/13
[52] U.S. Cl. .............. 349/156; 349/86; 349/93; 349/160; 349/201
[58] Field of Search ................. 349/86, 92, 160, 349/89, 90, 91, 93, 94, 201, 202, 110, 136, 116

[56] References Cited

U.S. PATENT DOCUMENTS

| | | | |
|---|---|---|---|
| 5,268,782 | 12/1993 | Wenz et al. | 359/81 |
| 5,299,289 | 3/1994 | Omae et al. | 349/201 |
| 5,473,450 | 12/1995 | Yamada et al. | 359/51 |

FOREIGN PATENT DOCUMENTS

| | | |
|---|---|---|
| 56-95217 | 8/1981 | Japan . |
| 58-219526 | 12/1983 | Japan . |
| 3-289622 | 12/1991 | Japan . |
| 5-264982 | 10/1993 | Japan . |
| 6-301015 | 10/1994 | Japan . |
| 7-28039 | 1/1995 | Japan . |
| 7-28071 | 1/1995 | Japan . |

*Primary Examiner*—Hung Xuan Dang
*Assistant Examiner*—Toan Ton
*Attorney, Agent, or Firm*—Dike, Bronstein, Roberts & Cushman, LLP; David G. Conlin

[57] ABSTRACT

This invention provides a liquid crystal display device including a display medium layer containing at least a liquid crystal material sandwiched between a pair of substrates. In this liquid crystal display device, at least one of the pair of substrates is a plastic substrate having first irregularities on a surface facing the display medium layer, and a polymer wall of a photocurable resin is formed in the display medium layer.

23 Claims, 12 Drawing Sheets

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device suitable for use in, for example, a portable information terminal, a personal computer and the like and a manufacturing method for the liquid crystal display device, and more particularly, it relates to a liquid crystal display device at least one of whose substrates is made of plastic and a manufacturing method for the liquid crystal display device.

2. Description of the Related Art

In most conventional liquid crystal display devices, glass substrates are used for sandwiching a liquid crystal layer. This is because the glass substrate is inexpensive and has very stable reliability against gasses such as oxygen and liquids such as water used in the manufacturing process. In addition, the glass substrate exhibits sufficient heat resistance even when an active element such as a TFT (thin film transistor) and an MIM (metal insulator metal) transistor is formed on the substrate, it has excellent smoothness on its surface, and can be used in large dimensions. The glass substrate is, however, heavy and brittle, and disadvantageously loses its smoothness when it is manufactured in a small thickness.

Accordingly, a plastic substrate and a film substrate, which are light, difficult to break and are applicable to a thin liquid crystal display device, are recently in the spotlight. Such a substrate is now used merely in a small liquid crystal display device for a pocket calculator or the like, and is characterized by having a surface more easily processed than the surface of a glass substrate.

Moreover, various techniques have recently been proposed for making thinner a liquid crystal display device and decreasing the manufacturing cost by unifying its composing members. For example, Japanese Laid-Open Patent Publication No. 5-264982 describes a technique of forming irregularities on the substrate surface by an embossing process so as to use a convex portion as a spacer. Also, Japanese Laid-Open Patent Publication No. 56-95217 describes a technique of forming irregularities on the substrate surface facing a liquid crystal layer by etching so as to use a convex portion as a spacer. Such techniques are advantageous in forming the spacer and the substrate as one member.

Furthermore, Japanese Laid-Open Patent Publication No. 5-264982 discloses a liquid crystal display device having a shock-resistant structure. In the shock-resistant structure, stripe-shaped protruding spacers are formed as a part of one of a pair of substrates and the stripe-shaped spacers are attached to the other substrate through an adhesive. In addition, Japanese Laid-Open Patent Publication No. 7-28071 discloses a wall structure, which is similar to the above-mentioned shock-resistant structure, for improving a shock resistance of a ferroelectric liquid crystal display device. This wall-structure is formed on a substrate by using a photosensitive resin, such as a resist material, and is formed in a stripe shape. In addition, Japanese Laid-Open Patent Publication No. 6-301015, which is assigned to the same assignee of the present application, discloses a liquid crystal display device in which a fine pixel is surrounded by a polymer wall.

Furthermore, Japanese Laid-Open Patent Publication No. 58-219526 discloses a substrate integrated with a polarizing plate and a reflection plate. Japanese Laid-Open Patent Publication No. 3-289622 describes a technique of forming irregularities on a substrate surface and also forming a metallic film on the irregular surface. These techniques are advantageous in forming the reflection plate and the substrate as one member. As a general method of producing a reflection plate, the surface of a plate is made irregular by a variety of methods such as etching, embossing and thermal sagging, and then a metallic film is formed on the irregular surface.

Conventionally, the reflection plate and the like are generally adhered to a desired substrate by using an adhesive agent or the like. The spacer is conventionally sprayed in general, but a technique of integrating a spacer with a plastic substrate has recently been proposed.

However, the liquid crystal display device disclosed in Japanese Laid-Open Patent Publication Nos. 5-264982 and No. 7-28071 suffers from the following problems. A liquid crystal material partitioned by the stripe-shaped structure tends to move along the longitudinal direction of the stripe shaped structure by an external pressure applied to the liquid crystal display device, resulting in deterioration of display quality. This problem is severe in the case where a relatively thin substrate or a substrate formed of a plastic plate is used.

A plastic substrate is, however, several times as expensive as a glass substrate, and hence it is very difficult to replace the glass substrate at present. For the replacement, not only the cost of the substrate itself must be decreased but also the entire manufacturing cost for a liquid crystal display device must be decreased and/or the manufacturing process for the liquid crystal display device must be simplified.

SUMMARY OF THE INVENTION

The liquid crystal display device of this invention comprises a display medium layer including at least a liquid crystal material sandwiched between a pair of substrates. In this liquid crystal display device, at least one of the pair of substrates is a plastic substrate having first irregularities on a surface facing the display medium layer, and a polymer wall of a photocurable resin is formed in the display medium layer.

In one embodiment, the first irregularities have a function of a spacer.

In another embodiment, the first irregularities are adhered to the other opposing substrate with an adhesive agent.

In still another embodiment, the first irregularities are formed as stripe-shaped convex portions in areas excluding pixel regions, and a plurality of the polymer walls of the photocurable resin are disposed in the areas excluding the pixel regions and extend in the direction perpendicular to the stripe-shaped convex portions of the first irregularities.

In still another embodiment, among the pair of substrates, the substrate opposing the substrate having the first irregularities with the display medium layer interposed therebetween is made from glass.

In still another embodiment, liquid crystal regions are disposed in areas on the substrate excluding areas where the convex portions of the first irregularities and the polymer wall are formed, and a molecule of liquid crystal in each liquid crystal region is twist oriented by a degree larger than 90° and smaller than 270°.

Alternatively, the liquid crystal is axially symmetrically oriented.

The invention provides also a method for manufacturing a liquid crystal display device comprising a display medium layer including at least a liquid crystal material sandwiched between a pair of substrates, at least one of the substrates being a plastic substrate having first irregularities on a surface facing the display medium layer, and a polymer wall of a photocurable resin being formed in the display medium layer. This method comprises the steps of forming the first irregularities as a plurality of convex portions on one of the pair of substrates continuously from a surface of the substrate; opposing the pair of substrates with the first irregularities facing the other substrate; injecting a material for the display medium layer including at least a liquid crystal material, a photocurable resin and a photoinitiator into a gap between the pair of substrates; and causing phase separation between the liquid crystal material and the photocurable resin by irradiating the material for the display medium layer.

Alternatively, the liquid crystal display device of this invention comprises a display medium layer including at least a liquid crystal material sandwiched between a pair of substrates. In this liquid crystal display device, at least one of the pair of substrates is a plastic substrate having first irregularities on one surface thereof facing the display medium layer and second irregularities on the other surface.

In one embodiment, the first irregularities and the second irregularities function optically and/or mechanically.

In another embodiment, convex portions of the first irregularities function as a spacer for controlling a gap between the pair of substrates, and a metallic film is formed on the second irregularities, and the second irregularities and the metallic film together function as a reflection plate.

In still another embodiment, the first irregularities are formed as a regularly repeated group of plural linearly extending steps having different heights, so that the plural steps having different heights provide the display medium layer with a plurality of areas having different thicknesses, and a metallic film is formed on the second irregularities, and the second irregularities and the metallic film together function as a reflection plate.

In still another embodiment, among the plural steps of the first irregularities, the highest steps function as a spacer for controlling a gap between the pair of substrates.

In still another embodiment, the first irregularities have convex portions corresponding to pixel regions, and the convex portions function as a shielding element for shielding light having a wavelength of 400 nm or less, and a metallic film is formed on the second irregularities, and the second irregularities and the metallic film together function as a reflection plate.

In still another embodiment, the plastic substrate having the first and second irregularities includes a polarizing plate.

In still another embodiment, the display medium layer includes polymer walls substantially surrounding liquid crystal regions.

In still another embodiment, the polymer walls have birefringence.

Alternatively, the invention provides also a method for manufacturing a liquid crystal display device comprising a display medium layer including at least a liquid crystal material sandwiched between a pair of substrates, at least one of the substrates being a plastic substrate. This method comprises the steps of forming the plastic substrate so as to have first irregularities on one surface and second irregularities on the other surface; and forming the display medium layer between the pair of substrates after opposing the substrates toward each other.

In one embodiment, the first irregularities and the second irregularities are formed on the plastic substrate by an embossing process.

In another embodiment, the first irregularities and the second irregularities are simultaneously formed on the plastic substrate.

In still another embodiment, the step of forming the display medium layer includes a step of injecting a mixture including at least a liquid crystal material, a photocurable resin and a photoinitiator into a gap between the substrates, and a step of irradiating the mixture through one of the substrates with light having a two-dimensional intensity distribution to cause phase separation between the liquid crystal material and the photocurable resin.

In still another embodiment, the step of irradiating the mixture with the light having the two-dimensional intensity distribution includes irradiating the mixture through the plastic substrate with light having a uniform intensity distribution, and the uniform intensity distribution is changed into the two-dimensional intensity distribution by the second irregularities.

In still another embodiment, the step of forming the plastic substrate includes a step of separating the plastic substrate from a large substrate material along concave portions of the second irregularities.

In still another embodiment, the second irregularities have at least one through hole, and the method is further provided with a step of injecting a material for the display medium layer through the through hole.

According to the present invention, first irregularities included in a substrate functioning as spacers may be located outside pixel regions. Therefore, no spacers exist in the pixel regions, thereby improving the display quality of the liquid crystal display device. Moreover, since the first irregularities are formed as a part of a substrate, the first irregularities will not delaminate from the substrate. In addition, the first irregularities may be easily formed without employing a photolithography technique. Moreover, it is possible to form a structure in which the fine pixel regions are surrounded by the first irregularities and polymer walls formed by a phase separation from a mixture containing a photocurable resin and a liquid crystal material. In this case, the amount of the photocurable resin and the photoinitiator included in the mixture can be reduced from that of the conventional method in which the walls partitioning the pixel regions are formed of only polymer walls which are formed by the phase separation (Japanese Laid-Open Patent Publication No. 7-301015), thereby improving the display quality. In this method, the light irradiation to the mixture may be conducted from one side of the liquid crystal display device by using a patterned electrode layer as a photomask to obtain a two-dimensional intensity distribution.

In this invention, a plastic substrate is used as at least one of the substrates included in a liquid crystal display device. The surface of the plastic substrate facing a display medium is provided with first irregularities, and the other surface is provided with second irregularities. These first and second irregularities function as part of structural members of the liquid crystal display device. The first and second irregularities can be provided with optical or mechanical functions.

The optical functions mean, for example, functions of a reflection plate, an antireflection film, a photo-mask for shielding light in a predetermined wavelength range, and a color reproduction property (gray level display) of a color filter. The mechanical functions mean, for example, functions of a general spacer, a spacer for a touch key, a multi-gap, orientation control, a separating line for obtaining a plurality of substrates from a large substrate material, a liquid crystal injection port and the like. The multi-gap herein means use of the dependency of the electro-optical characteristic of a display medium layer on its thickness when the display medium layer includes a plurality of areas respectively having different thicknesses. For example, when a TN liquid crystal layer is used as the display medium layer, a viewing angle can be increased, and when an FLC layer is used, a gray level display can be attained. Each of the areas having the different thicknesses can correspond to each pixel, or one pixel can include two or more areas having different thicknesses.

For example, the first irregularities can be provided with the functions of the spacer, the multi-gap, the color reproduction property (gray level display) of a color filter, the orientation control or the photomask. The second irregularities can be provided with the functions of the irregularities for a reflection plate, the antireflection film, the spacer for a touch key, the separating line or the injection port. Furthermore, in the case where a metallic film is formed on the irregularities for a reflection plate, the metallic film can prevent invasion of materials such as water and oxygen which can degrade liquid crystal.

These first and second irregularities can be simultaneously formed by an embossing process. In addition, during the formation of the irregularities, a polarizing plate can be formed to be unified with the plastic substrate having the first and second irregularities.

Furthermore, when a mixture including at least a liquid crystal material, a photocurable resin and a photoinitiator is injected into the gap between a pair of substrates and the mixture is externally irradiated through a shielding layer so as to cause phase separation between the liquid crystal material and the photocurable resin, a liquid crystal region is formed in a display medium layer at a position corresponding to the shielding layer, surrounded by a polymer wall. Owing to this polymer wall and the irregularities, a spacer excellent in shock resistance can be formed so as to substantially surround a pixel region. When the first irregularities have convex portions corresponding to pixel regions, the convex portions can be used as the shielding layer. Furthermore, when the mixture is irradiated through a polarizing plate, the polymer wall can be provided with birefringence (phase difference).

Thus, the invention described herein makes possible the advantages of providing (1) a liquid crystal display device having a higher resistance against impact with no significant movement of a liquid crystal material against a pressure externally applied, and a simple method for manufacturing such a liquid crystal display device; and (2) a liquid crystal display device having multiple functions which can be manufactured at a low manufacturing cost as well as providing a manufacturing method for the liquid crystal display device, by utilizing a plastic substrate which is thin, light and difficult to break.

These and other advantages of the present invention will become apparent to those skilled in the art upon reading and understanding the following detailed description with reference to the accompanying figures.

DESCRIPTION OF PREFERRED EMBODIMENTS

Figure 1A:
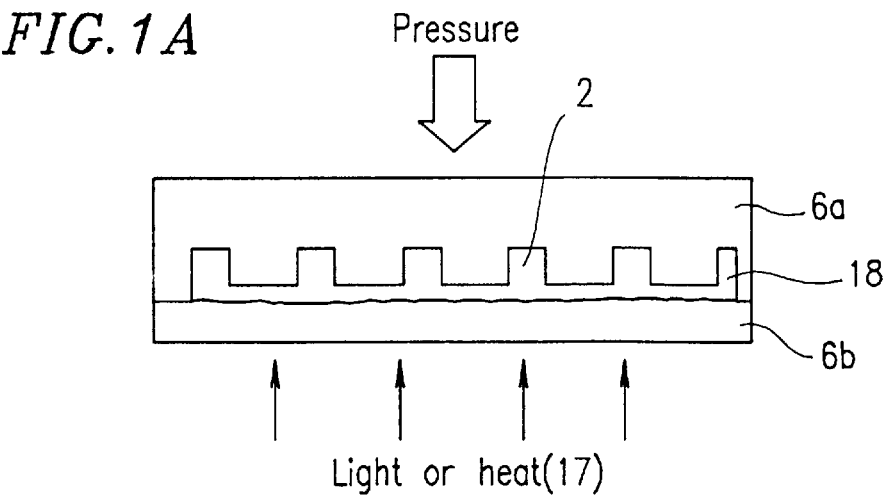
FIGS. 1A and 1B are sectional views for illustrating a manufacturing process for a plastic substrate of a liquid crystal display device of the invention.

The present invention will now be described by means of examples referring to the accompanying drawings. In all the drawings referred to in the following description, the same reference numerals are used to refer to similar elements for simplification.

Figure 1B:
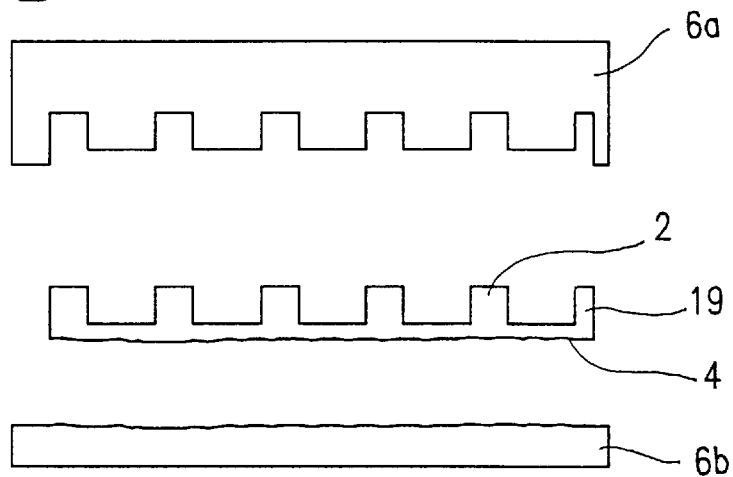

The liquid crystal display device of the invention includes a plastic substrate 19 as is shown in FIG. 1B. The plastic substrate 19 has first irregularities 2 on one surface and second irregularities 4 on the other surface and is located in the liquid crystal display device with the surface having the first irregularities 2 facing a display medium layer. The first and second irregularities 2 and 4 are respectively provided with optical and mechanical functions.

Formation of irregularities

As a method for forming irregularities on both surfaces of the plastic substrate 19, an embossing process or the like can be used.

In the embossing process, a deformable material to be processed is sandwiched between two molds of glass or the like (hereinafter referred to as the glass original plates), and externally supplied with energy such as light and heat, so as to provide the material with a shape in accordance with the molds. By adopting this method, the first and second irregularities 2 and 4 can be simultaneously formed and provided with the various functions.

First, as is shown in FIG. 1A, a photocurable resin or thermosetting resin 18 such as a crosslinked acrylic resin is sandwiched between glass original plates 6a and 6b on which the irregularities are previously formed, so as to be pressed into a predetermined thickness. In the case where the irregularities are provided with a UV light absorbing function to be used as a photo-mask, a UV light absorbing material such as anthraquinone is mixed in the resin 18. At this point, the resin 18 has a thickness of preferably in the range of about 0.1 mm to about 1 mm, and more preferably in the range of about 0.3 mm to about 0.6 mm.

Then, as is shown in FIG. 1B, the resin 18 is deformed into and fixed in a desired shape by applying energy 17, that is, light in the case using the photocurable resin and heat in the case of using the thermosetting resin. Thus, the substrate 19 having the first irregularities 2 and the second irregularities 4 on its surfaces can be produced. In the case where the substrate 19 is desired to be integrated with a polarizing plate, the resin is sealed between the glass original plates so as to sandwich the polarizing plate.

At this point, the substrate can be in the size of a general glass substrate of, for example, 360 mm×460 mm. When the substrate 19 has a thickness of about 0.5 mm or less, a roll-to-roll method is adoptable.

Size and shape of irregularities

Figure 2:
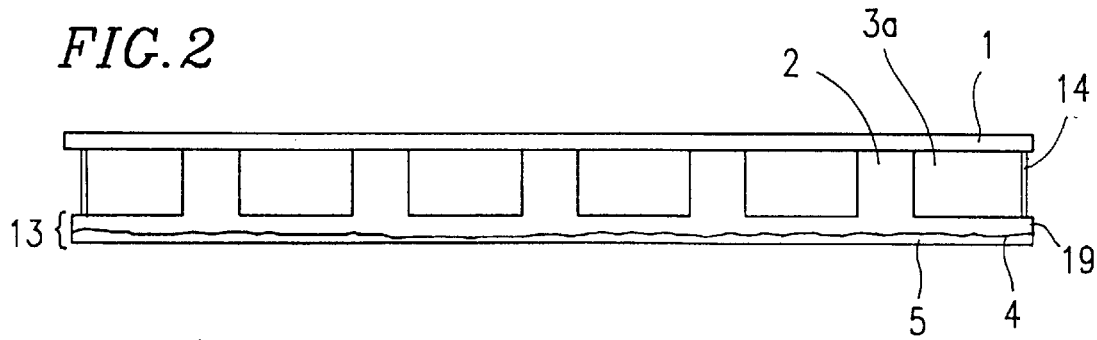
FIG. 2 is a sectional view for illustrating a manufacturing procedure for the liquid crystal display device of the invention.

When the first irregularities 2 are used as a spacer, the height of a convex portion in the irregularities can be arbitrary determined depending upon a cell gap and is not specifically restricted. For example, the height is about 1.2 $\mu$m through about 2 $\mu$m in the surface stabilized ferroelectric liquid crystal (SSFLC) mode, and about 5 $\mu$m through about 6 $\mu$m in the STN mode. The shape of the irregularities depends upon the functions to be attained. For example, when a rectangular convex portion 2 having a function of a spacer is desired to be formed in a non-electrode area as is shown in FIG. 2, the width of the convex portion 2 nearly accords with the width of the non-electrode area and is, for example, about 10 $\mu$m through 20 $\mu$m. Furthermore, the respective convex portions can be selectively formed in various shapes including a column, a cylinder and a sphere. In the section parallel to the substrate, the irregularities can be linearly formed or formed in any other shape.

In the case where the thickest portions of the substrate, i.e., the convex portions of the irregularities, are provided with the UV light absorbing function so as to be used as a photo-mask, the substrate has a thickness of preferably in the range of about 0.1 mm to about 1 mm, and more preferably in the range of about 0.3 mm to about 0.6 mm. The thinnest portion of the substrate is preferably about 10% through about 70%, and more preferably about 30% through about 60% of the thickest portion. In this case, when the irregularities 2 have the convex portions in areas corresponding to the pixel regions for use as a photo-mask, a polymer wall described below can be formed so as to surround each pixel region.

When the first irregularities 2 are formed in a stepwise shape, the first irregularities 2 can be used as the multi-gap by repeatedly forming a step having the spacer function and one or more lower steps. The multi-gap can be used for attaining the gray level display. Alternatively, the multi-gap can be used with the respective steps corresponding to respective colors of color filters, so that color display excellent in the color reproduction can be attained by using a color filter layer including a plurality of color filters.

The first irregularities 2 can be provided with orientation controllability by the following two methods. In one method, irregularities which can control orientation are formed on the liquid crystal layer to be used as an alignment film. In the other method, by forming irregularities on the surface of a substrate, irregularities are also formed on an alignment film in accordance with the irregularities on the substrate. At this point, a mixture mainly including a liquid crystal material and a polymerizable resin is injected between the substrates as the material for a display medium layer, and light or heat is applied to the injected mixture, thereby forming a liquid crystal region having two or more orientation directions with a convex portion of the irregularities as a symmetry axis.

In the case where the second irregularities 4 are used for a reflection plate, the average height of convex portions in the irregularities, i.e., a height difference between a convex portion and a concave portion, is about 0.1 through about 0.6 $\mu$m, and more preferably about 0.3 through about 0.5 $\mu$m. The pitch between the adjacent convex portions can be about 5 through about 25 $\mu$m on the average. When the irregularities are formed by the embossing process, the sizes of the convex and concave portions depend upon the irregularities previously formed on glass original plates. A glass original plate can be formed by etching the surface of a glass plate with an etching solution such as hydrofluoric acid. On the surface of the second irregularities 4, a metallic film 5 is formed out of a metal having high reflectance such as aluminum, silver and chrome as is shown in FIG. 2 by evaporation or sputtering, and a black mask (not shown) or the like can be further formed if necessary. The metallic film 5 can be formed before adhering the two substrates in the case where the material for the display medium layer includes merely the liquid crystal material described below. When the display medium layer is formed as a composite film including the liquid crystal material and a resin, the metallic film 5 is formed after forming the polymer wall.

Figure 3:
FIG. 3 is a sectional view for showing an example of the plastic substrate of the liquid crystal display device of the invention.
Figure 4:
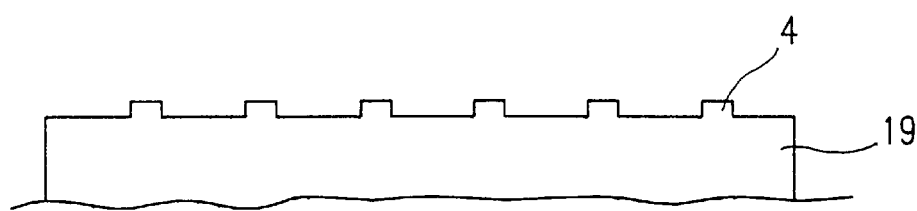
FIG. 4 is a sectional view for showing another example of the plastic substrate of the liquid crystal display device of the invention.
Figure 5:
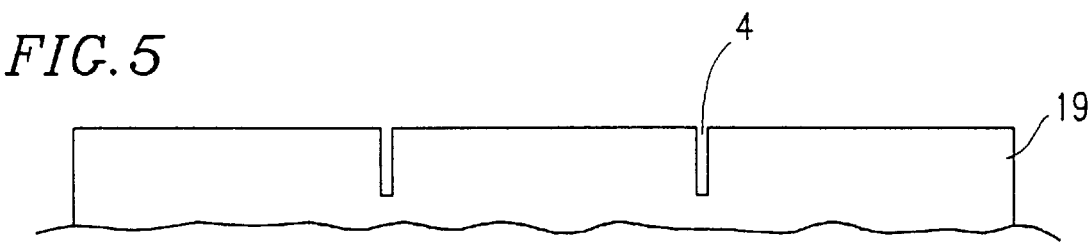
FIG. 5 is a sectional view for showing still another example of the plastic substrate of the liquid crystal display device of the invention.
Figure 6:
FIG. 6 is a sectional view for showing still another example of the plastic substrate of the liquid crystal display device of the invention.

Furthermore, the second irregularities 4 can be provided with an anti-glare function as is shown in FIG. 3, and can be formed into a shape usable as a spacer for a touch key as is shown in FIG. 4. Furthermore, the second irregularities 4 can be formed as a separating line for obtaining a plurality of substrates from a large substrate material as is shown in FIG. 5, and can be used for forming an injection port for injecting a liquid crystal material and the like into a cell as is shown in FIG. 6. In FIGS. 3 through 6, the first irregularities 2 and a counter substrate 1 are omitted.

Fabrication of liquid crystal cell

On the first irregularities 2 of the plastic substrate 19, a transparent electrode, an insulating film, an alignment film and the like are formed in this order if necessary. Also on the other substrate 1, a transparent electrode, an insulating film, an alignment film and the like are formed in this order if necessary.

The pair of substrates 1 and 19 are adhered to each other, with a spacer sandwiched therebetween if necessary. At this point, when the first irregularities 2 have the spacer function, the convex portions having the spacer function are preferably in contact with the other substrate 1. In this case, it is preferable to apply an adhesive on top surfaces of the convex portions in the first irregularities 2 having the spacer function and attach the convex portions through the adhesive to the counter substrate. When the first irregularities 2 do not have the spacer function, it is necessary to separately spray granular or bar spacers.

Formation of display medium layer

In a gap between the adhered two substrates, a display medium layer is formed. As the material for the display medium layer, a liquid crystal material alone or a composite film including a liquid crystal material and a resin can be used.

In the case where the display medium layer is formed out of a liquid crystal material alone, for example, nematic liquid crystal, cholesteric liquid crystal, ferroelectric liquid crystal, guest-host liquid crystal or the like is injected into the gap between the substrates.

In the case where the display medium layer is formed as the composite film, a homogenous mixture including at least a liquid crystal material, a photocurable resin and a photo-initiator is injected. As the liquid crystal material, any of the aforementioned liquid crystal can be used. As the photocurable resin, any of general acrylic monomers or oligomers including a monofunctional group or a polyfunctional group can be used, and those having a bar-like molecular structure similar to the skeleton of a liquid crystal molecule are preferred because the resin is mixed with the liquid crystal material. Alternatively, a liquid crystalline polymer material can be used. Furthermore, the photocurable resin is required to have a pressure resistance to some extent because a polymer wall used as the spacer is formed out of the photocurable resin, and it is also required to have reliability in retaining a high temperature. Therefore, a material having a high glass transition point Tg is preferred. As the photoinitiator, any of those having an absorption wavelength in the UV light range and generating a radical can be used.

Alternatively, a homogenous mixture including at least a liquid crystal material, a thermosetting resin and a thermoinitiator can be injected. As the liquid crystal material, any of the aforementioned liquid crystal can be used. As the thermosetting resin, any of the acrylic resins, the epoxy resins and the polyimide resins can be used, and an example of these resins includes an aliphatic epoxy resin, specifically, denacol EX-314 (manufactured by Nagase Chemical Industries Co., Ltd.). As the thermoinitiator, a curing accelerator, Epomic Q-610 (manufactured by Mitsui Petrochemical Industries, Ltd.) or the like can be used.

For the injection, any of the known methods including vacuum injection can be adopted.

Figure 7:
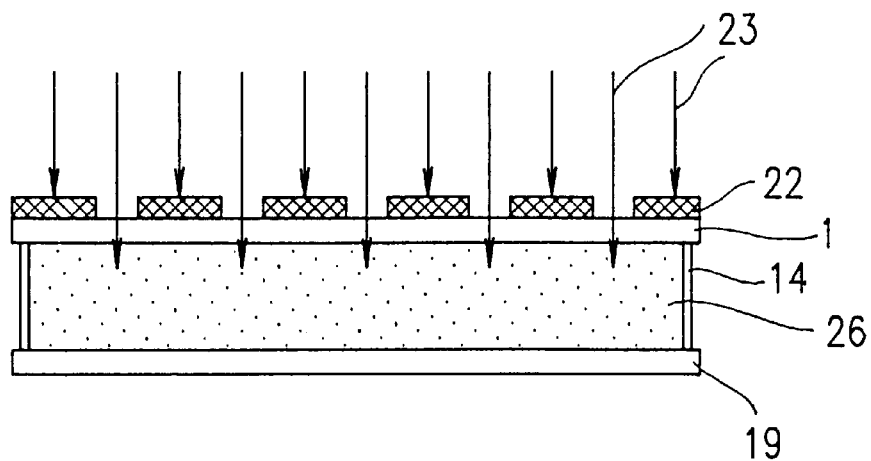
FIG. 7 is a sectional view for illustrating another manufacturing procedure for the liquid crystal display device of the invention.
Figure 8:
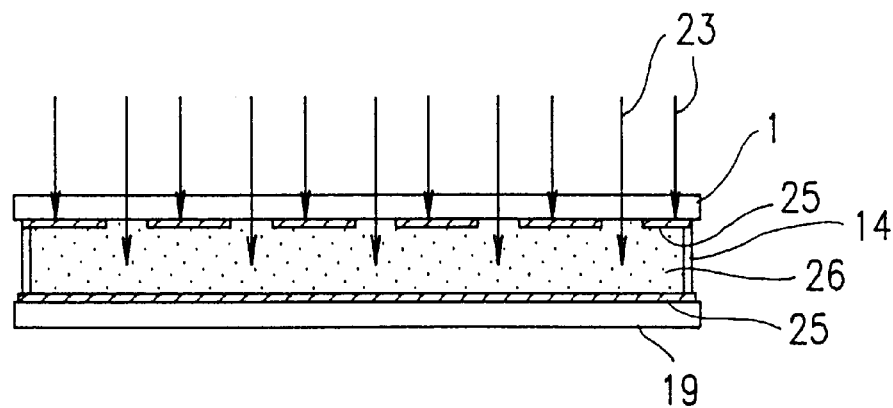
FIG. 8 is a sectional view for illustrating still another manufacturing procedure for the liquid crystal display device of the invention.
Figure 9:
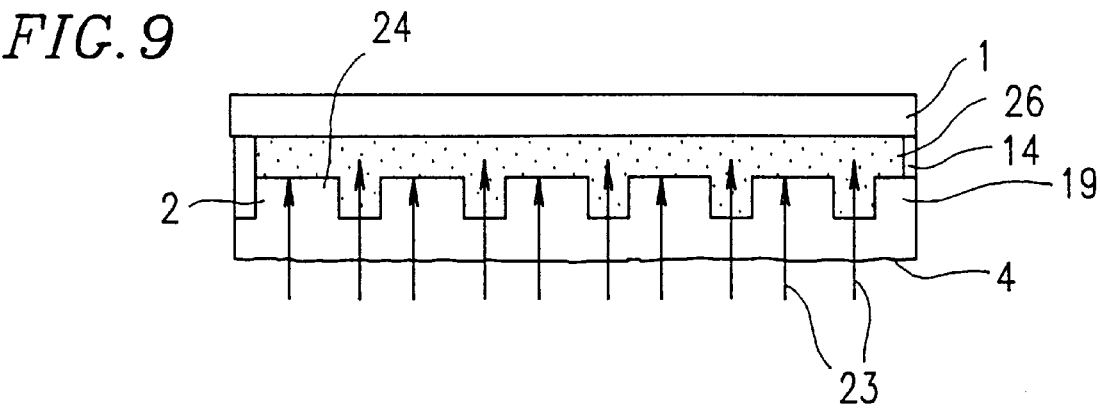
FIG. 9 is a sectional view for illustrating still another manufacturing procedure for the liquid crystal display device of the invention.

In the case where the mixture including the liquid crystal material, the photocurable resin and the photoinitiator is injected, the mixture 26 is irradiated with light 23 after the injection. For example, the mixture is irradiated with UV light by using a high pressure mercury lamp at the intensity of about 5 through about 10 $mW/cm^2$, and more preferably about 6 through about 8 $mW/cm^2$, for about 2 through about 6 minutes, and more preferably about 3 through about 5 minutes. In the irradiation of the mixture, the light intensity on the mixture is selectively changed by providing a photo-mask 22 on the outer surface of the substrate 1 as is shown in FIG. 7, providing a transparent electrode 25 such as an ITO electrode on the substrate 1 as is shown in FIG. 8, or providing a UV light absorbing layer (shielding layer) 24 as is shown in FIG. 9. In particular, when the ITO electrode 25 is used as the photo-mask, the ITO electrode is preferably formed by low temperature sputtering because its UV light transmittance can be decreased thereby. In FIGS. 7 and 8, the irregularities 2 and 4 formed on the substrate 19 are omitted.

Figure 10:
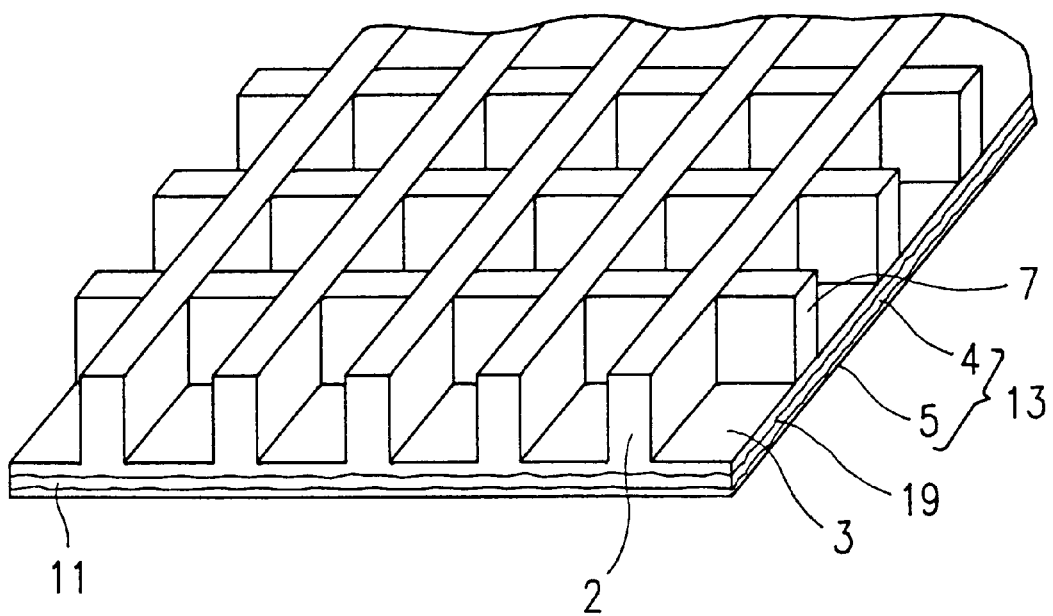
FIG. 10 is a perspective view for illustrating the manufacturing process for the liquid crystal display device of the invention.

When the mixture is irradiated through the substrate 19 as is shown in FIG. 9, the convex portions of the first irregularities 2 can be used as a photomask, namely, the UV light absorbing layer 24, for absorbing or shielding UV light. In such irradiation, by forming the photo-mask 22 or the convex portions of the first irregularities 2 serving as the UV light absorbing layer 24 correspondingly to each pixel, a liquid crystal region 3 can be formed in a pixel region to be surrounded by polymer walls 7 as shown in FIG. 10. Alternatively, the polymer walls 7 can be formed to surround the pixel region by using a pixel electrode including a transparent conductive film as a photo-mask.

In the irradiation, the material for the display medium layer sandwiched between the substrates is preferably heated to a temperature at which the material is in an isotropic liquid crystalline state. After the irradiation, the substrate and the material are preferably gradually cooled to room temperature or lower. Then, the material is further irradiated with UV light for curing the resin if necessary. By causing the phase separation between the liquid crystal material and the resin in this manner, the liquid crystal region 3 surrounded by the polymer walls 7 can be formed as is shown in FIG. 10.

When the material for the display medium layer is irradiated through the substrate bearing the polarizing plate, the UV light is polarized along the light absorption axis of the polarizing plate, so that the axes of the molecules of the polymerized resin are aligned in the polarizing direction. As a result, the polymer wall 7 is uniaxially oriented and attains birefringence.

In the case where the mixture including the liquid crystal material, the thermosetting resin and the thermoinitiator is injected, heat is applied to the mixture for causing the phase separation between the liquid crystal material and the thermosetting resin. As a method for causing the thermal polymerizing phase separation, for example, line scan or spot scan with a laser can be adopted.

When a combination of the thus formed polymer walls 7 and the first irregularities 2 on the substrate is provided with the spacer function, it is possible to obtain a rigid cell whose gap cannot be varied. Furthermore, a pixel region can be surrounded by the irregularities 2 on the substrate and the polymer walls 7, and hence, no spacer is formed in a pixel region, resulting in increasing the contrast of the liquid crystal display device. In addition, since the polymer wall 7 having a uniaxial phase difference can be formed, the light utilization efficiency can be improved.

Display mode and driving method

As a display mode, any of the twisted nematic mode, the super twisted nematic mode, and the electrically controlled birefringence (ECB) mode can be used. Furthermore, the invention is applicable to a liquid crystal display device including ferroelectric liquid crystal (SSFLC). As a driving method, either of the duty drive and the active drive can be adopted.

Substrate

At least one of the substrates having the irregularities on its surface is made of plastic. The other substrate can be a plastic substrate, a glass substrate, a metal substrate or the like, or a substrate bearing an active element and the like can be also used. When the plastic substrate having the irregularities does not have the reflecting function, this substrate can be placed on the side through which light enters the liquid crystal display device.

Configuration of first irregularities and counter substrate

In the case where the first irregularities function as spacers, the first irregularities may be physically or chemically attached to a counter substrate through an adhesive applied to top surfaces of the convex portions of the first irregularities.

Now, the embodiments of the present invention will be specifically described. It is noted that the invention is not limited to the following examples.

EXAMPLE 1

FIG. 2 is a sectional view of a liquid crystal display device of this example.

This liquid crystal display device comprises substrates 1 and 19 bearing transparent electrodes, insulating films and alignment films (not shown), adhered to each other with a seal 14, and a liquid crystal layer 3a serving as a display medium layer sandwiched between the substrates 1 and 19. The substrate 19 is made of plastic, and has first irregularities 2 on one surface facing the liquid crystal layer 3a acting as a spacer. The substrate 19 also has second irregularities 4 on the other surface, on which a metallic film 5 is further formed, so as to serve as a reflection plate 13. The second irregularities 4 serve as part of the reflection plate 13 for suppressing light interference in reflection.

Figure 11:
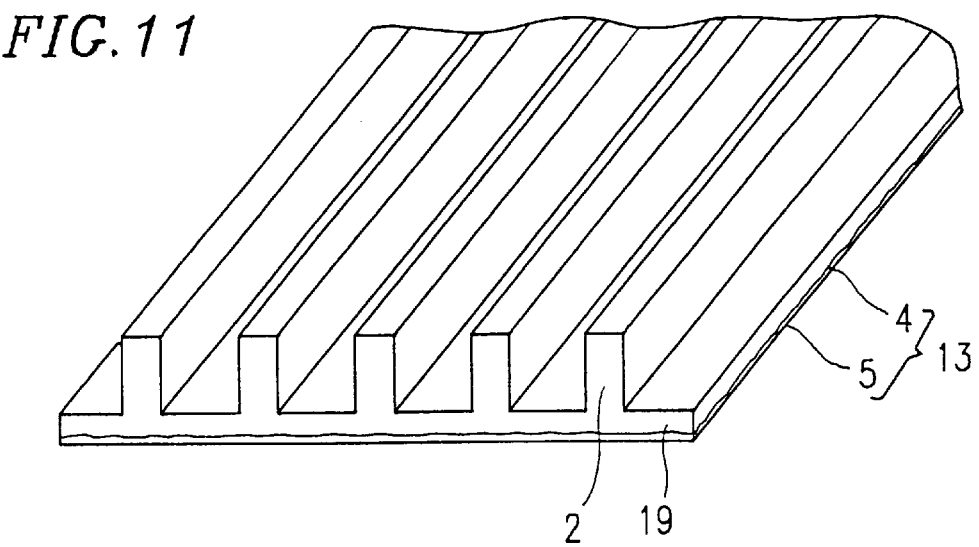
FIG. 11 is a sectional view of a plastic substrate of a liquid crystal display device of Example 1 of the invention.

The liquid crystal display element is manufactured in the following manner:

First, the plastic substrate 19 having the first and second irregularities 2 and 4 is formed by the embossing process as follows: Between a pair of glass original plates 6a and 6b previously formed as molds, an acrylic photocurable resin 18 is sandwiched and pressed into a thickness of, for example, about 0.4 mm. Under this condition, the resin 18 is irradiated through the glass original plate 6a with UV light 17 to be cured. As a result, the second irregularities 4 having the optical function for the reflection plate are formed on one surface of the cured resin in, for example, an average height of 0.5 $\mu$m with an average pitch of 5 $\mu$m. On the other surface, the first irregularities 2 serving as the spacer and having the mechanical function are formed as, for example, linearly extending walls (convex portions) each having a height of about 5 $\mu$m and a width of about 15 $\mu$m with a pitch of about 200 $\mu$m as shown in FIG. 11.

Furthermore, on the surface of the irregularities 4 for the reflection plate, the metallic film 5 of aluminum, silver or the like is formed by a known method such as evaporation. In this example, an aluminum film with a thickness of 200 nm is formed thereon, thereby obtaining a reflection plate 13 as shown in FIG. 2.

Next, in convex portions of the irregularities 2, that is, the spaces between the walls, on the substrate 19 and on the surface of the other substrate 1, transparent electrodes of an ITO film or a NESA film are formed by any of the known methods. In this example, ITO electrodes (not shown) are formed by a known method. On the surface bearing these electrodes, insulating films (not shown) of $SiO_2$ or the like and alignment films (not shown) of polyimide or the like are formed in this order, and the alignment films are subjected to a rubbing treatment with a nylon cloth or the like.

Then, these two substrates 1 and 19 are adhered to each other with their faces bearing the electrodes opposing each other, and the liquid crystal material is injected into the gap between the substrates 1 and 19 to form the liquid crystal layer 3a. In this example, guest-host liquid crystal is injected by a known method, thereby completing a reflection type liquid crystal display device as is shown in FIG. 2.

This reflection type liquid crystal display device has a very small thickness because the reflection plate 13 is integrated with the substrate 19. Furthermore, since the rectangular walls (convex portions of the irregularities 2) are formed between the substrates so as to serve as the spacer, the liquid crystal display device is rigid against an external pressure in spite of being thin and including the plastic substrate. Therefore, the variation of the thickness of the cell against an external pressure can be suppressed. In this liquid crystal display device, the spacer can be disposed with higher controllability than in the spraying method, and hence, the spacer can be placed in areas excluding the pixel regions, so as to suppress light scattering otherwise caused by the spacer. Thus, the state of a displayed image (contrast) can be improved. In addition, since the rectangular walls (convex portions of the irregularities 2) can be formed in the areas excluding the pixel regions, no spacer exists in any pixel region, resulting in improved contrast. Since these various functions can be provided to the plastic substrate by the embossing process at the same time, the manufacturing process can be remarkably simplified.

EXAMPLE 2

Figure 12:
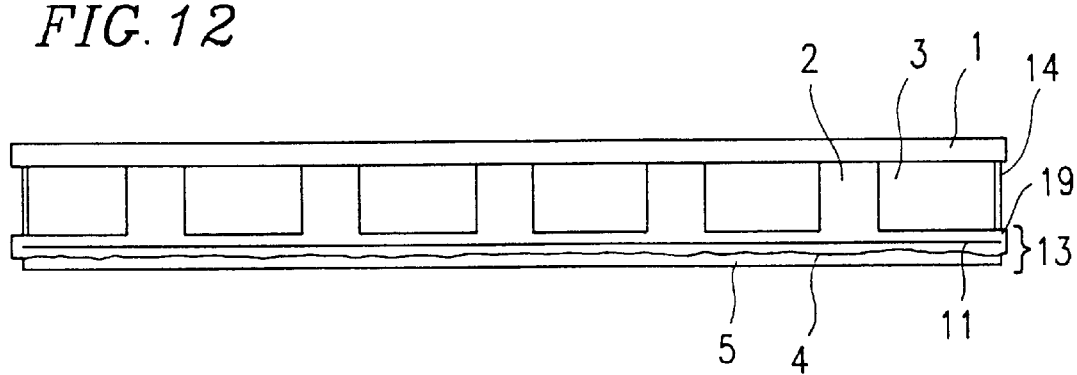
FIG. 12 is a sectional view of a liquid crystal display device of Example 2 of the invention.

In a liquid crystal display device manufactured in this example, as is shown in FIG. 12, a polarizing plate 11 is included within and integrated with one substrate 19.

First, through the embossing process, the plastic substrate 19 having first irregularities 2 and second irregularities 4 and integrated with the polarizing plate 11 is formed as follows: As is shown in FIG. 1A, between a pair of glass original plates 6a and 6b previously formed as molds, an acrylic photocurable resin 18 with the polarizing plate 11 of a polymer material including iodine interposed, is pressed into a thickness of 0.5 mm. Under this condition, the resin 18 is irradiated with UV light 17 through the glass original plate 6a to be cured. As a result, the second irregularities 4 having the optical function for the reflection plate are formed on one surface. On the other surface, the first irregularities 2 serving as the spacer and having the mechanical function are formed as linearly extending walls. Thus, the substrate 19 integrated with the polarizing plate can be obtained.

Then, by using this substrate 19, a reflection type liquid crystal display device as is shown in FIG. 12 is fabricated in the same manner as described in Example 1.

Figure 13:
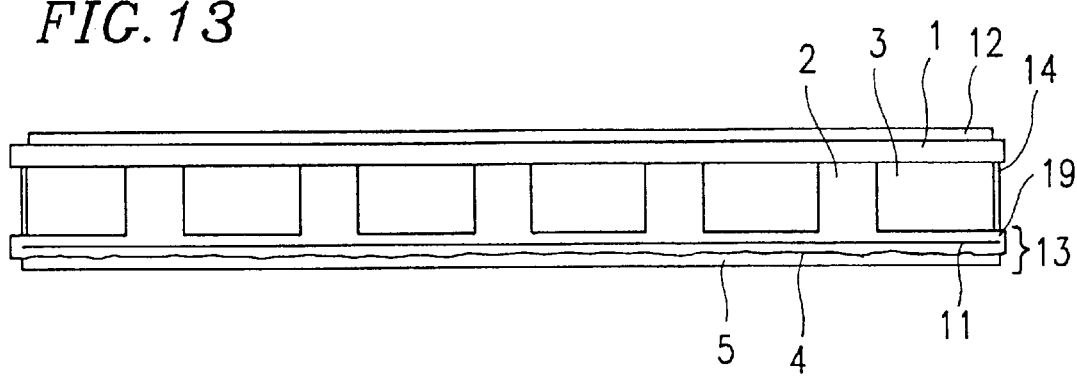
FIG. 13 is another sectional view of the liquid crystal display device of Example 2.

This reflection type liquid crystal display device includes the substrate 19 integrated with the reflection plate and the polarizing plate, and hence, the thickness of the entire device can be further decreased. Furthermore, since the polarizing plate can be simultaneously formed by the embossing process, the manufacturing process can be further simplified. When the liquid crystal display device is desired to be used in a display mode requiring two polarizing plates, such as the TN mode and the STN mode, another polarizing plate 12 can be formed on the other substrate 1 as is shown in FIG. 13. Alternatively, the other substrate 1 can be formed as a plastic substrate integrated with another polarizing plate 11. In this manner, this liquid crystal display device has a wide range of applications.

EXAMPLE 3

In this example, a liquid crystal display device including a display medium layer in which a liquid crystal region 3 is surrounded by polymer walls 7 as shown in FIG. 10 is manufactured. In FIG. 10, a counter substrate 1 is omitted.

First, similarly to Example 2, a plastic substrate 19 having first irregularities 2 and second irregularities 4 and unified with a polarizing plate 11 is formed by the embossing process as follows: Between a pair of glass original plates 6a and 6b previously formed as molds as shown in FIG. 1A, a UV-curable resin 18 is sandwiched therebetween with the polarizing plate 11 interposed, and is pressed into a thickness of, for example, about 0.4 mm. Under this condition, the resin 18 is irradiated with UV light 17 through the glass original plate to be cured. As a result, the second irregularities 4 having the optical function of a reflection plate are formed on one surface in, for example, an average height of 0.5 $\mu$m with an average pitch of 5 $\mu$m. On the other surface, the first irregularities 2 serving as a spacer having the mechanical function are formed as linearly extending walls (convex portions) each having, for example, a height of 5 $\mu$m and a width of 15 $\mu$m with a pitch of 200 $\mu$m. Thus, the substrate 19 integrated with the polarizing plate can be formed.

Then, in the same manner as described in Example 1, transparent electrodes (not shown), insulating films (not shown) and alignment films (not shown) are formed in this order, and a rubbing treatment is subsequently conducted on the alignment films. The substrate 19 is then adhered to the counter substrate with the faces bearing the electrodes opposing each other.

Next, a homogenous mixture including at least a liquid crystal material, a photocurable resin and a photoinitiator is injected into the gap between the substrates by any of the known methods. In this example, the STN liquid crystal is used as the liquid crystal material, an acrylic resin is used as the photocurable resin, and Irgacure 651 (manufactured by Ciba Geigy AG) is used as the photoinitiator.

The mixture is irradiated with UV light having a two-dimensional light intensity distribution, thereby causing phase separation between the liquid crystal material and the photocurable resin. Thus, the polymer walls 7 of the cured photocurable resin as shown in FIG. 10 are formed. In order to obtain a regular two-dimensional light intensity distribution, for example, UV light is irradiated through a photo-mask 22 as is shown in FIG. 7, or an ITO electrode 25 which can easily absorb UV light is used as a photo-mask as is shown in FIG. 8.

On the surface of the irregularities 4 for the reflection plate, an aluminum film 5 is formed in a thickness of 200 nm by evaporation, thereby obtaining a reflection plate 13.

A polarizing plate 12 is adhered to the counter substrate of the cell fabricated as described above, and thus, the reflection type nematic liquid crystal display device as is shown in FIG. 10 is manufactured.

In this reflection type liquid crystal display device, the liquid crystal region 3 is finely partitioned by the irregularities 2 (convex portions) and the polymer walls 7 as is shown in FIG. 10. Therefore, the device is rigid against an external pressure and has higher shock resistance than that of Example 1. Furthermore, since the reflection plate 13 and the polarizing plate 11 are integrated with the substrate 19, the liquid crystal display device can attain a small thickness even in the application of a display mode requiring a polarizing plate. In addition, since the walls of the irregularities 2 and the polymer walls 7 can be formed in areas excluding the pixel regions, no spacer exists in any of the pixel regions, thereby improving the contrast. When an input/output touch keyboard is provided on this liquid crystal display device, a lightpen entry type liquid crystal display with a small thickness can be manufactured.

EXAMPLE 4

A liquid crystal display device manufactured in this example includes a display medium layer in which a liquid crystal region 3 is surrounded by polymer walls 7 having birefringence (phase difference).

Into a liquid crystal cell fabricated in the same manner as described in Example 3, a homogenous mixture including at least a liquid crystal material, a photocurable resin and a photoinitiator is injected by a known method. The mixture is irradiated with UV light through the substrate having the polarizing plate, thereby forming the display medium layer. Then, the procedures as described in Example 3 are conducted, thereby completing the liquid crystal display device including an integrated polarizing plate and a reflection plate.

In this liquid crystal display device, since UV light is polarized along the light absorption axis of the polarizing plate in the irradiation of the mixture, the molecular axis of the resin to be polymerized is aligned along the polarizing direction. As a result, the polymer wall 7 formed by polymerizing the photocurable resin is uniaxially oriented and has a phase difference. When UV light is irradiated without passing through the polarizing plate, the resultant polymer wall 7 is optically isotropic, and hence, the light utilization efficiency is low. However, when the polymer wall 7 is uniaxially oriented, the light utilization efficiency can be improved by controlling the axial angle of the polarizing plate and using a phase plate. As a result, the brightness of the liquid crystal display device can be improved.

EXAMPLE 5

Figure 14:
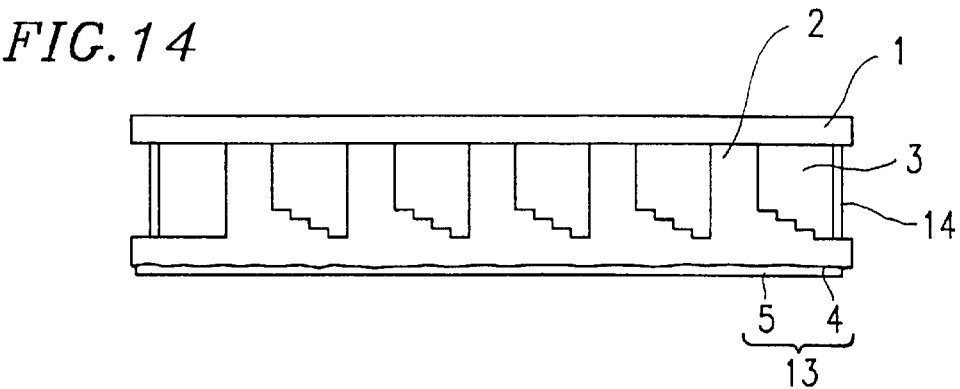
FIG. 14 is a sectional view of a liquid crystal display device of Example 5.

A liquid crystal display device manufactured in this example includes groups of a plurality of steps having different heights as first irregularities 2 as is shown in FIG. 14.

Figure 15:
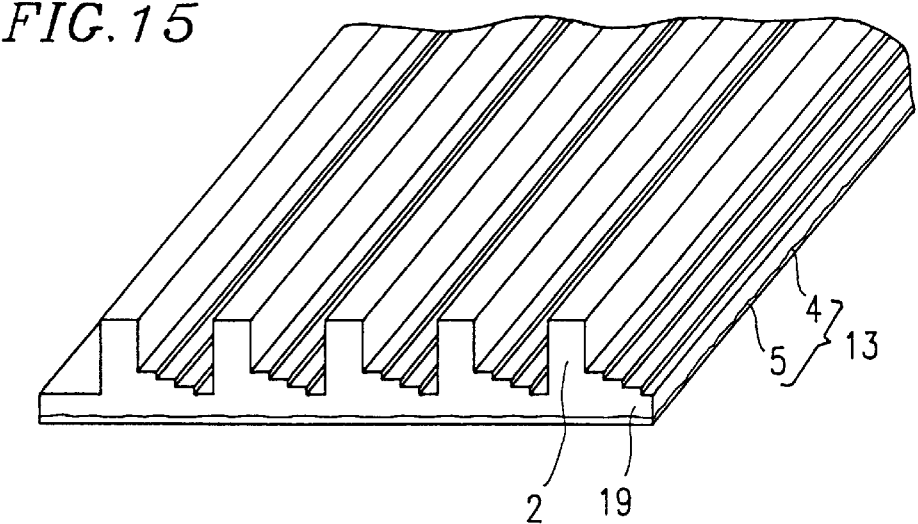
FIG. 15 is a perspective view of the liquid crystal display device of Example 5.

First, as shown in FIG. 1A, a plastic substrate 19 having the first irregularities 2 and second irregularities 4 is formed by the embossing process as follows: A UV-curable resin is sandwiched between a pair of glass original plates previously formed as molds, and irradiated with UV light through the glass original plate 6a to be cured. As a result, the second irregularities 4 having the optical function for a reflection plate are formed on one surface of the cured resin in, for example, an average height of about 0.5 $\mu$m with an average pitch of about 5 $\mu$m. On the other surface, the first irregularities 2 serving as the spacer or the multi-gap and having the mechanical function are formed as repetition of a group of steps including, for example, a step with a height of about 5 $\mu$m and a width of about 15 $\mu$m, a step with a height of about 2 $\mu$m and a width of about 50 $\mu$m, a step with a height of about 1.5 $\mu$m and a width of about 50 $\mu$m, a step with a height of about 1.0 $\mu$m and a width of about 50 $\mu$m, and a step with a height of about 0.5 $\mu$m and a width of about 50 $\mu$m as shown in FIG. 15.

Then, similar to Example 1, a reflection film 5 is formed on the second irregularities 4. Furthermore, transparent electrodes (not shown), insulating films (not shown) and alignment films (not shown) are formed in this order, and the substrate 19 is adhered to the counter substrate with their faces bearing the electrodes opposing each other. At this point, the highest steps with a height of about 5 μm in the first irregularities 2 are in contact with the counter substrate 1 so as to serve as the spacer. In this manner, the resultant liquid crystal cell includes the steps with the height of about 5 μm in the shape of walls serving as the spacer, and the other steps having the heights of about 2 μm, 1.5 μm, 1.0 μm, 0.5 μm and 0 μm, serving as the multi-gap, between two adjacent walls.

Then, a liquid crystal material is injected into the gap between the substrates by a known method to form the liquid crystal layer 3. In this example, a nematic liquid crystal is used.

A polarizing plate and a phase plate are adhered to the counter substrate 1, thereby completing the reflection type liquid crystal display device as is shown in FIG. 14.

In this reflection type liquid crystal display device, the liquid crystal layer 3 is formed in the multi-gap having different heights, and hence, a gray level display can be attained by applying an electric field. Since the reflection plate 13 is integrated with the substrate 19, the entire liquid crystal display device has a very small thickness. Moreover, since the highest steps formed as the walls serve as the spacer, the liquid crystal display device is rigid against an external pressure in spite of including the thin plastic substrate, and the variation of the cell thickness against an external pressure can be suppressed. Since the walls can be formed in areas excluding pixel regions, no spacer exists in any of the pixel regions, resulting in improving the contrast. In addition, since these various functions can be provided at the same time by the embossing process, the manufacturing process can be remarkably simplified.

Figure 16:
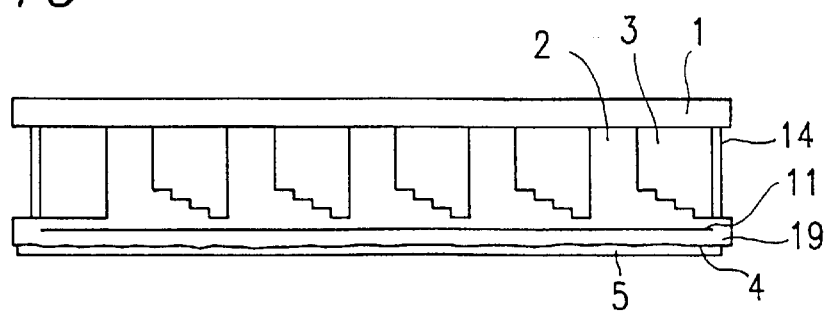
FIG. 16 is another sectional view of the liquid crystal display device of Example 5.

For the application to a display mode requiring a polarizing plate on the substrate 19, in the formation of the substrate 19, the UV-curable resin is sandwiched between the glass original plates previously formed as the molds with a polarizing plate 11 interposed, and pressed into a thickness of, for example, about 0.5 mm. Under this condition, the resin is irradiated with UV light through the glass original plate to be cured, thereby obtaining the substrate 19 integrated with the polarizing plate as is shown in FIG. 16. Since the polarizing plate can be thus simultaneously formed through the embossing process, not only can the liquid crystal display device be made thin but also the manufacturing process can be simplified.

Furthermore, when color filters are used together, the cell gap can be used as the multi-gap without changing the thicknesses of the color filters. Thus, the liquid crystal display device can be applied to color image display with ease.

EXAMPLE 6

Figure 17:
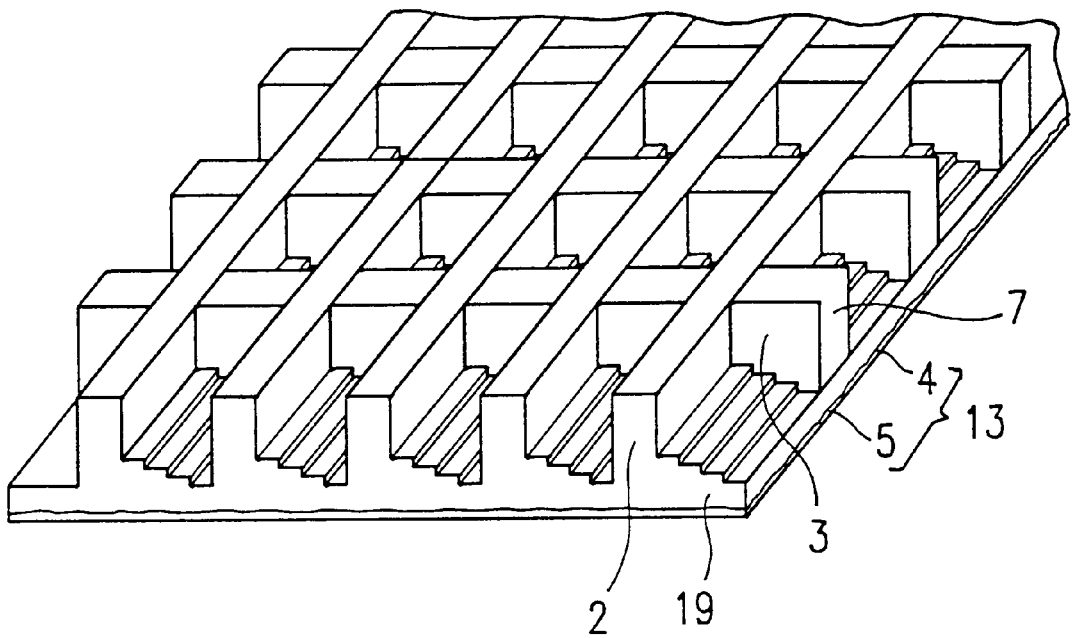
FIG. 17 is a perspective view of a liquid crystal display device of Example 6.

A liquid crystal display device manufactured in this example includes a display medium layer in which a liquid crystal region 3 is surrounded by polymer walls 7 and first irregularities 2 formed as groups of a plurality of steps having different heights as is shown in FIG. 17. In FIG. 17, a counter substrate 1 is omitted.

Into a liquid crystal cell fabricated in the same manner as described in Example 5, a homogenous mixture including at least a liquid crystal material, a photocurable resin and a photoinitiator is injected by a known method. In this example, the STN liquid crystal is used as the liquid crystal material, an acrylic resin is used as the photocurable resin, and Irgacure 651 (manufactured by Ciba Geigy AG) is used as the photoinitiator.

The mixture is irradiated with UV light having a two-dimensional light intensity distribution, thereby causing phase separation between the liquid crystal material and the photocurable resin. Thus, the polymer walls 7 of the cured photocurable resin as shown in FIG. 17 are formed. In order to obtain a regular two-dimensional light intensity distribution, for example, the UV light is irradiated through the photo-mask 22 as is shown in FIG. 7, or the ITO electrode 25 which can easily absorb UV light is used as a photo-mask as is shown in FIG. 8.

Then, similarly to Example 5, the reflection type liquid crystal display device as is shown in FIG. 17 is manufactured.

In this reflection type liquid crystal display device, the liquid crystal region 3 is partitioned by the walls formed as the highest steps of the irregularities and the polymer walls 7 as is shown in FIG. 17. Therefore, the cell gap cannot be varied by an external pressure. Accordingly, a displayed image cannot be disturbed, and the device is applicable to the lightpen entry. Thus, the gray level display can be easily attained even in a display mode such as SSFLC which is conventionally difficult to apply to the gray level display. In addition, when color filters are used together, the cell gap can be used as the multi-gap without changing the thicknesses of the color filters, and the liquid crystal display device can be applied to color image display with ease.

EXAMPLE 7

Figure 18:
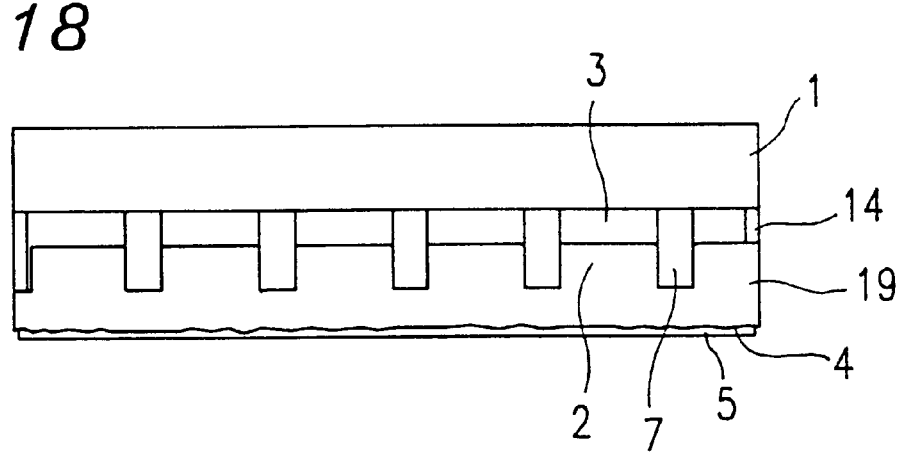
FIG. 18 is a sectional view of a liquid crystal display device of Example 7.

In a liquid crystal display device manufactured in this example, first irregularities 2 having convex portions corresponding to pixel regions are formed as is shown in FIG. 18, and by using these irregularities as a shielding film, a display medium layer in which a liquid crystal region 3 is surrounded by polymer walls 7 is formed.

First, a plastic substrate 19 having the first irregularities 2 and second irregularities 4 is formed by the embossing process as follows: A photocurable resin is sandwiched between a pair of glass original plates previously formed as molds, and is then irradiated with UV light through the glass original plate to be cured. As a result, the second irregularities 4 having the optical function of a reflection plate are formed on one surface of the cured resin in, for example, an average height of 0.5 μm with an average pitch of 5 μm. On the other surface, the first irregularities 2 serving as the shielding film and having the optical function are formed as linearly extending steps each having, for example, a height of 2 μm and a width of 200 μm with a pitch of 20 μm. As the photocurable resin, those including a UV light absorbing material such as anthraquinone can be used.

Then, on the substrate 19 and a counter substrate 1, transparent electrodes (not shown), and if necessary, insulating films (not shown) and alignment films (not shown) are formed in this order. These substrates are adhered to each other with the faces bearing the electrodes opposing each other with a spacer interposed therebetween.

A homogenous mixture including at least a liquid crystal material, a photocurable resin and a photoinitiator is then injected into the gap between the substrates by a known method.

The mixture is irradiated with UV light through the plastic substrate 19 as is shown in FIG. 9, so as to cause phase separation between the liquid crystal material and the photocurable resin. The linearly extending steps in the first irregularities 2 are higher than the remaining portions, and hence absorb more UV. Therefore, the photocurable resin is collected at the portions excluding the steps, resulting in forming the polymer walls 7 as shown in FIG. 18.

A polarizing plate and a phase plate are adhered to these substrates if necessary, thereby completing the reflection type nematic liquid crystal display device as shown in FIG. 18.

Figure 19:
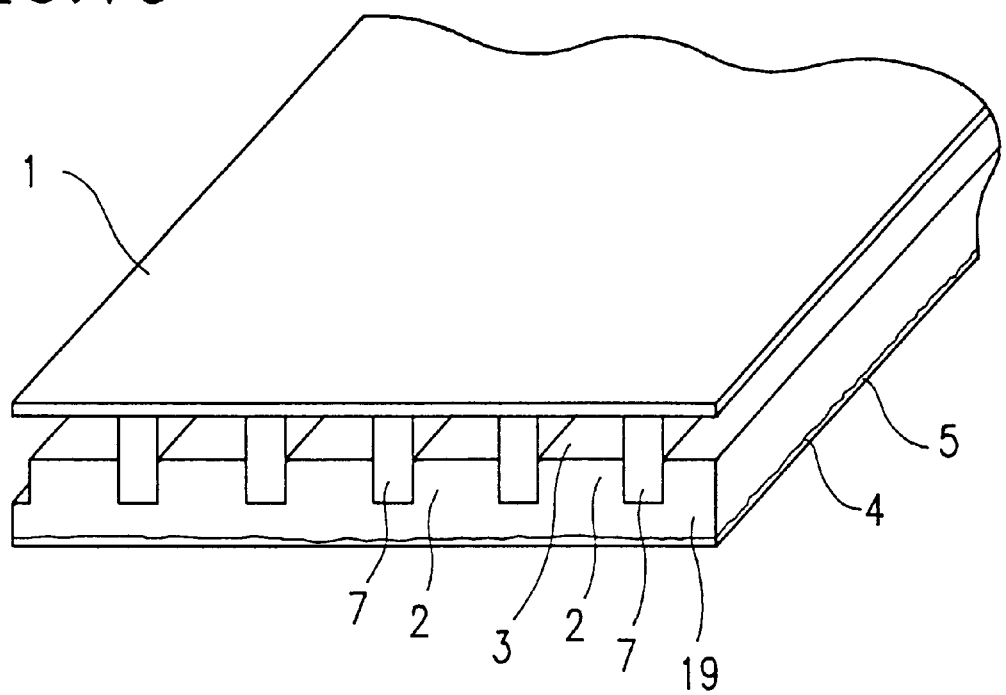
FIG. 19 is a perspective view of the liquid crystal display device of Example 7.
Figure 20:
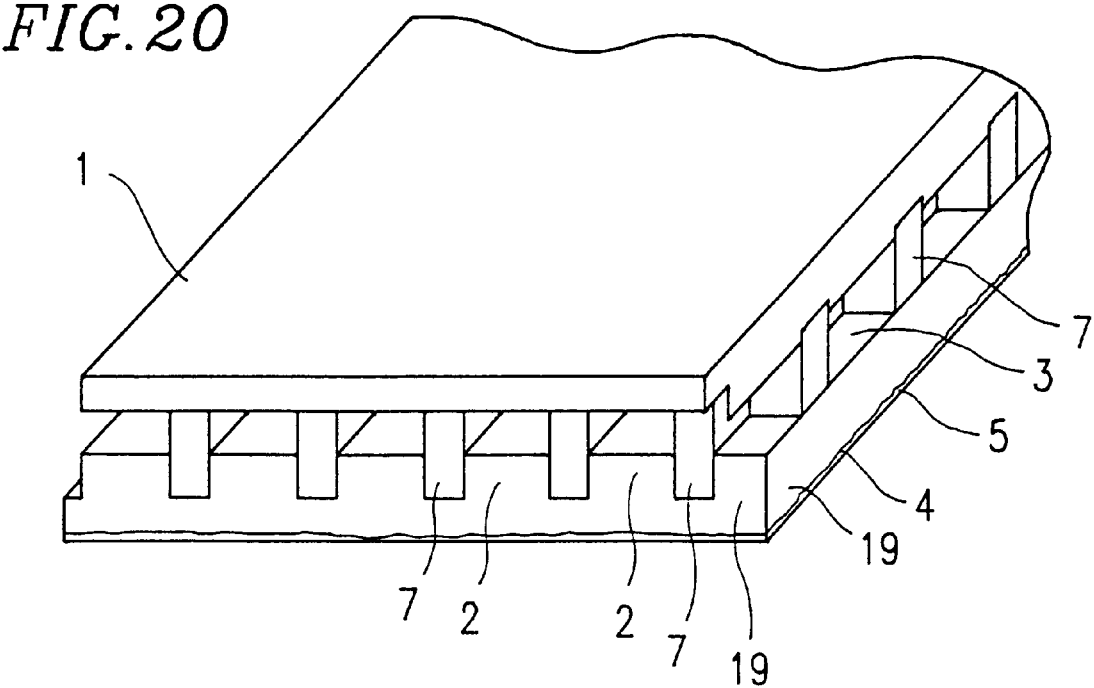
FIG. 20 is another perspective view of the liquid crystal display device of Example 7.

In this reflection type liquid crystal display device, the polymer walls 7 serve as the spacer, and hence, the cell gap is not largely varied by an external pressure. The areas for the polymer walls 7 can be controlled in accordance with the positions of the convex portions of the first irregularities 2 with ease, so that the polymer walls 7 can be formed in areas excluding the pixel regions. Thus, the contrast can be improved. Furthermore, the second irregularities 4 for the reflection plate and the first irregularities for selectively absorbing UV light can be integrated with the substrate. When the convex portions of the first irregularities 2 are formed in the pixel regions, the polymer walls as shown in FIG. 20 can be obtained. In this case, the variation of the cell gap can be further suppressed as compared with that in the structure shown in FIG. 19, and the resultant liquid crystal display device has better shock resistance.

Figure 21:
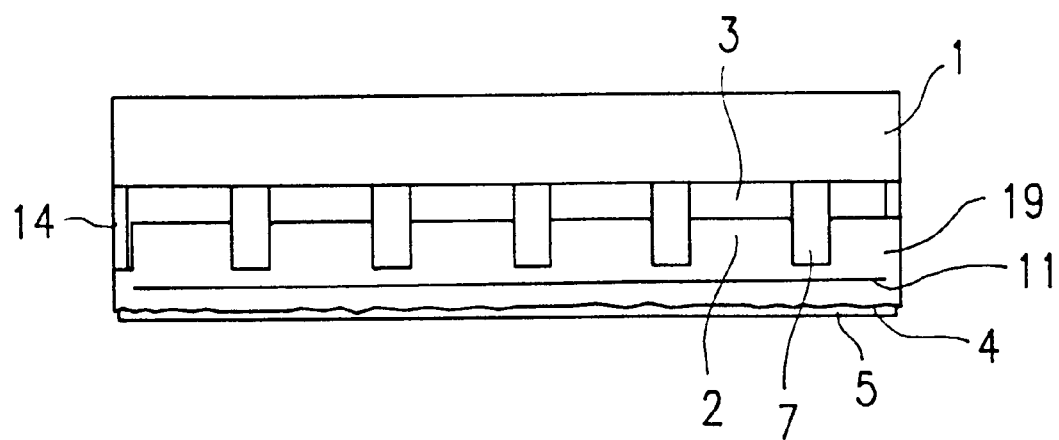
FIG. 21 is a sectional view of the liquid crystal display device of Example 7.

For the application to the display mode requiring a polarizing plate on the substrate 19, in the formation of the substrate 19, a UV-curable resin is sandwiched between the glass original plates previously formed as the molds with a polarizing plate 11 interposed, and is pressed into a thickness of, for example, about 0.5 mm. Under this condition, the resin is irradiated with UV light through the glass original plate to be cured, thereby forming the substrate 19 integrated with a polarizing plate as shown in FIG. 21. Since the polarizing plate can be thus simultaneously formed by the embossing process, not only the liquid crystal display device can be made thin but also the manufacturing process can be simplified.

EXAMPLE 8

Figure 22:
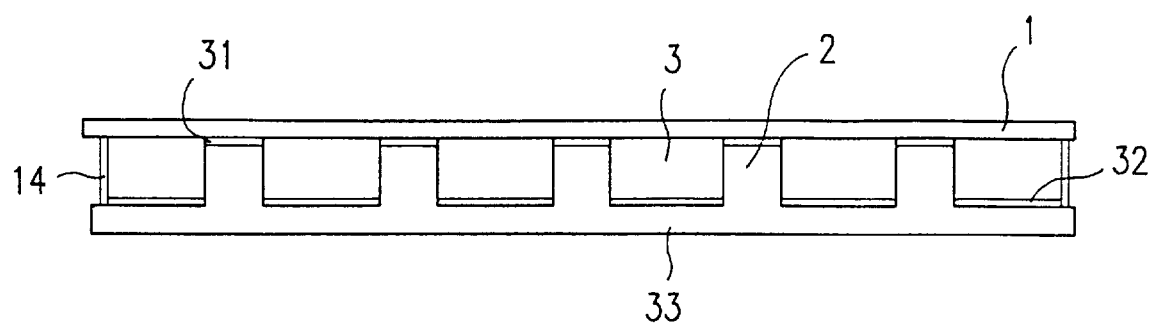
FIG. 22 is a sectional view of a liquid crystal display device of Example 8.
Figure 23:
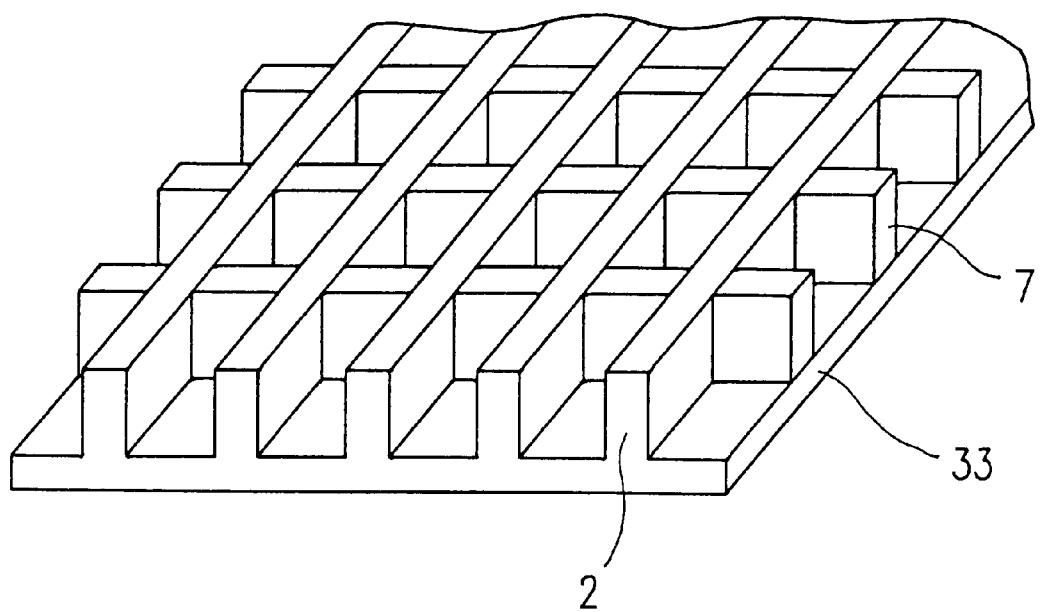
FIG. 23 is a perspective view of the liquid crystal display device of Example 8.

FIG. 22 is a sectional view of a liquid crystal display device of this example, and FIG. 23 is a perspective view of one substrate of the liquid crystal display device. In this liquid crystal display device, first irregularities 2 continuously formed from the surface of a substrate 33 and polymer walls 7 formed on the substrate 33 out of transparent electrodes are disposed so as to surround pixel regions, in each of which a liquid crystal region 3 is disposed. The substrate 33 of plastic opposes another substrate 1 of glass or plastic. More specifically, on the surface of the substrate 33 facing the substrate 1, a plurality of convex portions of the first irregularities 2 are formed in the shape of stripes. In the spaces between the convex portions of the first irregularities 2, transparent electrodes 32 are disposed. The convex portions of the irregularities 2 are adhered to the counter substrate 1 with an adhesive agent 31. On the transparent electrode 32, an alignment film and an insulating film can be formed, which are not shown. Furthermore, the polymer walls 7 are formed out of a photocurable resin so as to extend in the direction perpendicular to the convex portions of the first irregularities 2. In the spaces between the polymer walls 7 on the substrate 1, the transparent electrodes 32 are also disposed for driving the liquid crystal. In the area excluding the first irregularities 2 and the polymer walls 7, the liquid crystal region 3 is disposed.

Now, the manufacturing method for the liquid crystal display device will specifically described.

In this embodiment, the irregularities are formed on one surface of the substrate by the embossing process. Alternatively, the irregularities can be formed by injection molding.

Figure 24A:
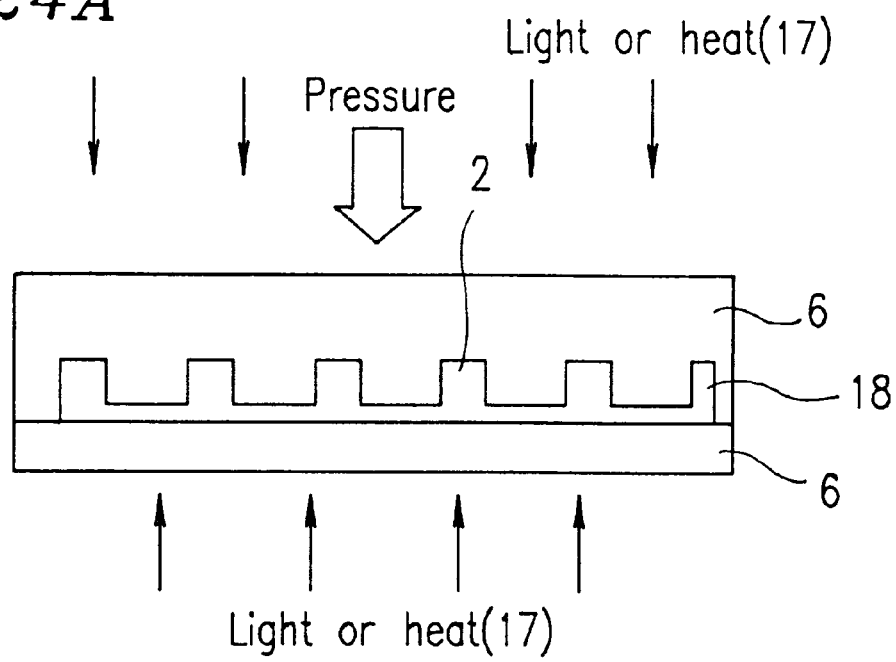
FIGS. 24A and 24B illustrate an embossing process for forming a substrate having first irregularities on one surface alone to be used in any of Examples 8 through 10.
Figure 24B:
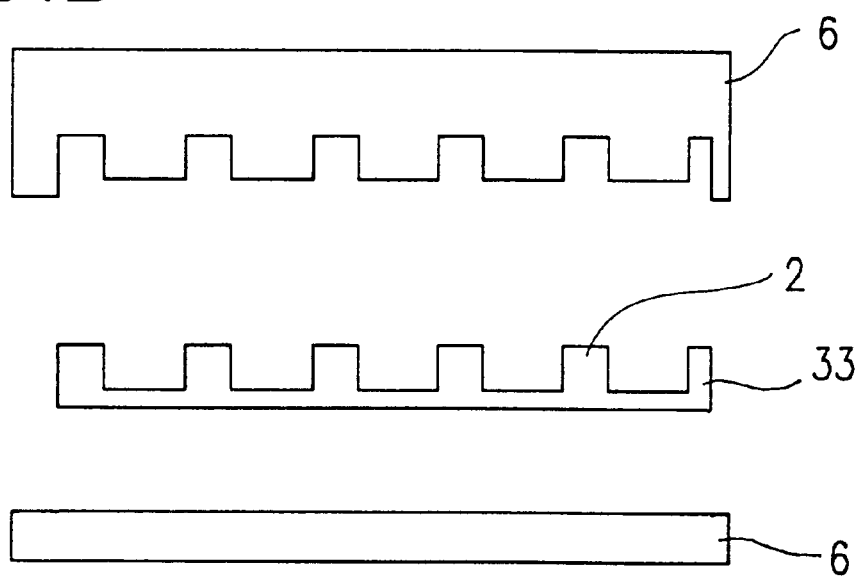

An acrylic photocurable resin is sandwiched between two glass original plates 6a and 6b previously formed as molds as is shown in FIG. 24A and pressed into a thickness of, for example, about 0.4 mm. Under this condition, the resin is irradiated with UV light 17 through the glass original plate to be cured, thereby forming the first irregularities 2 serving as the spacer and having the mechanical function in the form of the convex portions each having, for example, a height of about 5 $\mu$m and a width of about 25 $\mu$m with a pitch of about 200 $\mu$m. The plastic substrate 33 is thus formed.

Next, between the convex portions of the first irregularities 2 on the plastic substrate 33 and on the substrate 1 of an acrylic resin as shown in FIG. 22, transparent electrodes are formed out of oxide of indium and tin (i.e., ITO film), a NESA film or the like by a known method. In this example, ITO electrodes are formed by a known method such as photolithography.

Then, on the surfaces bearing the transparent electrodes, the insulating films of $SiO_2$ or the like and the alignment films of polyimide (both of which are not shown) are formed in this order, and the alignment films are subjected to the rubbing treatment with a nylon cloth or the like.

These two substrates are adhered to each other with their faces bearing the electrodes opposing each other. At this point, it is possible to apply the adhesive agent on the highest portions of the irregularities so that these portions are chemically and physically adhered to the alignment film on the counter substrate.

Then, a material for a display medium layer including a liquid crystal material is injected into the gap between the substrates by vacuum injection. The material used in this example is a homogeneous mixture of 4.5 g of STN liquid crystal, for example, ZLI-4427 (manufactured by Merck & Co., Ltd) including s-811 (chiral agent), 0.495 g of the photocurable resin such as adamantyl acrylate and stearyl acrylate and 0.005 g of the photoinitiator such as Irgacure 651.

The material is then irradiated with UV light having a two-dimensional light intensity distribution. In this example, the ITO electrode which can easily absorb UV light is used as the photo-mask as is shown in FIG. 8, and the material is irradiated not through the substrate 33 having the first irregularities 2 but through the substrate 1 with UV light at the intensity of 7 mW/cm$^2$ for approximately 3 minutes. At this point, the material is preferably in an isotropic liquid state. Then, the material is gradually cooled to room temperature, thereby forming the polymer walls 7 perpendicular to the stripe-shaped convex portions of the first irregularities 2 on the substrate. It is preferred that the material is irradiated with UV light again in order to increase the degree of crosslinking of the cured polymer. Furthermore, in order to stabilize the orientation of the liquid crystal, it is preferred that the liquid crystal material is heated to a temperature at which it is in an isotropic liquid state, and then gradually cooled.

The liquid crystal cell manufactured in the aforementioned manner has a structure as is shown in FIG. 22 in which the liquid crystal region is finely partitioned by the convex portions of the first irregularities 2 and the polymer walls 7. Therefore, by adhering a polarizing plate, a phase plate and a reflection plate to this liquid crystal cell, which is rigid against an external pressure, a reflection type or transmission type liquid crystal display device can be manufactured. Furthermore, when an input touch keyboard is disposed on the liquid crystal display device, it can be used as a lightpen entry device.

EXAMPLE 9

In this example, the substrate 1 of the acrylic resin used in Example 8 is replaced with a glass substrate, and a liquid crystal cell is similarly manufactured. The transparent electrode can be formed on the glass substrate by low temperature sputtering at a temperature of approximately 120° C., or by depositing a ZnO film on an ITO electrode formed by sputtering at a high temperature. Alternatively, in the case where the ITO electrode is not used as the photo-mask and for example, a separate photo-mask is disposed on the outer surface of the substrate in order to obtain the intensity distribution of the irradiating light, the ITO electrode can be formed by the sputtering at a high temperature as in a general method.

In the liquid crystal cell manufactured in this manner, there is no need to provide a gas barrier layer on the glass substrate 1.

Although STN liquid crystal is used in Examples 8 and 9, the STN liquid crystal can be replaced with the TN liquid crystal, the SSFLC or the guest-host liquid crystal.

EXAMPLE 10

In this example, first irregularities 2 are formed on one surface of a substrate by the embossing process. Alternatively, the irregularities can be formed by injection molding.

An acrylic photocurable resin is sandwiched between two glass original plates 6a and 6b previously formed as molds as is shown in FIG. 24A, and pressed into a thickness of, for example, 0.4 mm. Under this condition, the resin is irradiated with UV light 17 through the glass original plate to be cured, thereby forming the first irregularities 2 serving as the spacer and having the mechanical function in the form of convex portions each having, for example, a height of 5 $\mu$m and a width of 15 $\mu$m with a pitch of 200 $\mu$m. A plastic substrate 33 is thus formed.

Next, between the convex portions of the first irregularities 2 on the plastic substrate 33, transparent electrodes are formed out of oxide of indium and tin (i.e., ITO film), a NESA film or the like by a known method. In this example, an ITO electrode is formed by a known method such as photolithography. The other substrate 1 is provided with a TFT for electrically connecting the transparent electrode with an external drive circuit.

These two substrates 1 and 33 are adhered to each other with the faces bearing the electrodes opposing each other. At this point, it is possible to apply an adhesive agent on the highest portions of the irregularities so that these portions are chemically and physically adhered to the alignment film on the counter substrate.

Next, into the liquid crystal cell manufactured in the aforementioned manner, the following homogenous mixture is capillary-injected: 0.20 g of R-684, 0.20 g of p-phenyl styrene, 0.10 g of a compound A represented by the following formula, 4.5 g of a liquid crystal material ZLI-4792 (manufactured by Merk & Co., Ltd; $\Delta n=0.094$), and 0.025 g of the photoinitiator, Irgacure 651.

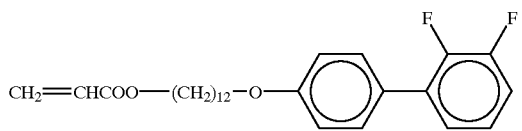

The temperature is then increased to obtain a homogenous phase, and is decreased so that one liquid crystal region is formed in each pixel region.

Then a voltage of about ±5.0 V is applied between the transparent electrodes, thereby obtaining the axial symmetrical orientation of the liquid crystal. Under this condition, the temperature is decreased to room temperature. In order to fix the orientation at this point, the mixture is irradiated with UV light by using a high pressure mercury lamp at the intensity of about 3 mW/cm$^2$ (at 365 nm) for 30 minutes. Then, the mixture is successively irradiated with UV light for about another 20 minutes to cure the resin.

The liquid crystal cell manufactured in this manner has a structure as is shown in FIG. 22 in which the liquid crystal region is finely partitioned by the convex portions of the first irregularities 2 and the polymer walls 7, and the liquid crystal in each liquid crystal region is axially symmetrically oriented. When a stress is applied to this liquid crystal cell under observation with a polarization microscope, no variation of the cell thickness can be found and the orientation is not disturbed.

In the aforementioned Examples 8 through 10, embodiments described in the following items can be adopted:

Formation of irregularities

The irregularities can be formed by injection molding instead of the embossing process.

Structure of substrate

A plastic substrate is generally required to have a gas barrier layer for shielding from a gas such as oxygen and air and a liquid such as water. However, in a substrate integrated with a reflection plate and in the case of a glass substrate, there is no need to provide the gas barrier layer.

Furthermore, when the substrate has the first irregularities alone, also the substrate can be provided with the polarizing function.

Counter substrate

The counter substrate 1 can be made from plastic, glass or a metal, and can be provided with an active element such as a TFT and an MIM.

Shape of first irregularities

Although the shape of the continuous stripes is most suitable as is described in the examples, the first irregularities can be partly divided with an arbitrary length or can be formed in a stepwise shape. Alternatively, the first irregularities can be formed as a block in the shape of a column or the like disposed in the areas excluding the pixel regions.

Furthermore, without forming the second irregularities, the steps for the multi-gap and the photo-mask can be formed as the first irregularities.

Relationship between first irregularities and transparent electrode

When the first irregularities are formed in, for example, the shape of the stripes, the transparent electrode is not necessarily required to be in contact with the first irregularities. In the case where the first irregularities are not in contact with the transparent electrode, the polymer wall is also formed between the convex portion of the first irregularities and the transparent electrode through the phase separation between the liquid crystal material and the photocurable resin. In this case, the polymer wall can further assist the adhesion between the highest portions of the first irregularities and the counter substrate 1.

Relationship between convex portions of the first irregularities and counter substrate When the convex portions of the first irregularities work as the spacer, it is possible to apply an adhesive agent to the top surfaces of the convex portions so as to be chemically or physically adhered to the counter substrate.

As is known from the description above, since the first irregularities continuously formed from the surface of the substrate and serving as the spacer and the polymer walls of the photocurable resin are disposed in the areas excluding the pixel regions, no spacer is present in any of the pixel regions in the present liquid crystal display device. As a result, the degradation of the contrast otherwise caused by the spacer can be avoided, and the optical characteristic of the device can be improved. Furthermore, in the conventional case, since the first irregularities are unified with the substrate, any external shock can move the spacer. As a result of the present invention, the disclination of the liquid crystal can be prevented from being caused by the movement of the spacer, and the reliability of the liquid crystal display device can be improved.

Moreover, in the conventional technique of forming similar stripe-shaped walls by using a resist film or the like, the resist film can remain on the substrate, specifically on the alignment film, or the alignment film can be abraded. However, since the first irregularities are formed during the formation of the substrate in this invention, such problems can be avoided.

Furthermore, the stripe-shaped convex portions of the first irregularities continuously formed from the surface of the substrate are perpendicular to the stripe-shaped polymer walls of the photocurable resin, so as to partition and surround the liquid crystal region in each pixel region. Accordingly, the flow of the liquid crystal layer is suppressed to a possible minimum, and the structure can attain excellent pressure resistance. For surrounding each liquid crystal region, the polymer walls of the photocurable resin extend in one direction and the convex portion of the first irregularities integrated with the substrate extend in the other perpendicular direction in the present device. Therefore, as compared with conventional polymer walls of a photocurable resin for surrounding a liquid crystal region by themselves alone, the required amount of photocurable resin can be substantially halved. As a result, the separation of the liquid crystal material and the photocurable resin can be prevented before and after the injection of the mixture, and hence, the phase separation can be stabilized in the present manufacturing process. In addition, since very small amounts of the unreacted photocurable resin and photoinitiator remain in the liquid crystal material after the phase separation, a display failure can be suppressed in use of the present liquid crystal display device.

Also, in contrast to the conventional device during the phase separation, light can be irradiated from just one side when the conventional ITO electrode that hardly transmits light is used as the photo-mask. Therefore, the manufacturing cost can be decreased, which is industrially advantageous. When the reflection plate is integrated with the plastic substrate, a gas barrier layer, which is generally necessary for a plastic substrate, is not required on the plastic substrate when the counter substrate is of glass.

Furthermore, in this invention, at least one of the substrates included in the device is a plastic substrate, which has the first irregularities on its surface facing the display medium layer and has second irregularities on the other surface, and the first and second irregularities are respectively provided with the optical or mechanical functions.

For example, the first irregularities can be provided with the functions of the spacer, the multi-gap, the color reproduction of a color filter, the orientation control, the photo-mask, and the like. The second irregularities can be provided with the functions of irregularities for the reflection plate, the antireflection film, the spacer for a touch key, the separating line, the injection port and the like.

When the first irregularities are used as the spacer, the resultant device has excellent strength with a cell gap little varied by an external pressure. In addition, since there is no need to separately spray a spacer, and the convex portions used as the spacer can be well controlled to be disposed in the areas excluding the pixel regions, the contrast can be improved and the display quality can be remarkably improved.

When the first irregularities are formed as the steps serving as the multi-gap, the gray level display can be easily achieved also in the SSFLC mode and the STN mode, which are conventionally difficult to adopt in the gray level display, and the color display can be easily realized.

When the convex portions of the first irregularities correspond to the pixel regions and are used as the photo-mask, the display medium layer including the liquid crystal regions surrounded by the polymer walls can be easily manufactured in a self-alignment manner. In this case, the polymer walls can be formed so as to surround each pixel region, and the resultant device can attain further strength against an external pressure.

When the second irregularities are formed as the irregularities for the reflection plate and a metallic film is formed thereon, the reflection plate can be integrated with the substrate. As a result, a thin liquid crystal display device can be manufactured.

Furthermore, since the second irregularities can be provided with the aforementioned various functions, not only the resultant device can be made thin but also the manufacturing process can be simplified.

These first and second irregularities can be easily formed by the embossing process and can be simultaneously formed on both surfaces of the substrate. Therefore, the manufacturing process can be largely simplified. In addition, when the embossing process is adopted, a polarizing plate can be formed between the first and second irregularities to be integrated with the substrate.

In the phase separation between the liquid crystal material and the polymerizable resin, when the mixture is irradiated through the polarizing plate, the resultant polymer wall has a phase difference. Therefore, the light utilization efficiency can be improved and a bright image can be displayed by adjusting the axial angle of the polarizing plate and using a phase plate.

In this manner, the present invention provides a liquid crystal display device of various functions including a thin, light and strong plastic substrate, and additionally, the device can be made thin and the structure can be simplified. Moreover, the invention is very useful also in the industrial field because the manufacturing process can be also simplified and the manufacturing cost can be decreased.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a display medium layer including at least a liquid crystal material sandwiched between a pair of substrates, wherein at least one of the pair of substrates is a plastic substrate having first irregularities on a surface facing the display medium layer, and a plurality of polymer walls of a photocurable resin is formed in the display medium layer, wherein the first irregularities function as a spacer, and wherein the first irregularities are formed as stripe-shaped convex portions in areas excluding pixel regions, and the plurality of polymer walls of the photocurable resin are disposed in areas excluding the pixel regions and extend in a direction perpendicular to the stripe-shaped convex portions of the first irregularities.

2. The liquid crystal display device according to claim 1, wherein the first irregularities are adhered to the other opposing substrate with an adhesive agent.

3. The liquid crystal display device according to claim 1, wherein, among the pair of substrates, the substrate opposing the substrate having the first irregularities with the display medium layer interposed therebetween is made from glass.

4. The liquid crystal display device according to claim 1, wherein liquid crystal regions are disposed in areas on the substrate excluding areas where the convex portions of the first irregularities and the polymer wall are formed, and a molecule of liquid crystal in each liquid crystal region is twist oriented by a degree larger than 90° and smaller than 270°.

5. The liquid crystal display device according to claim 4, wherein the molecule of the liquid crystal is axially symmetrically oriented.

6. A liquid crystal display device according to claim 1, wherein the at least one of the pair of substrates further includes second irregularities on another surface opposite to the surface facing the display medium.

7. The liquid crystal display device according to claim 6, wherein the first irregularities and the second irregularities function optically and/or mechanically.

8. The liquid crystal display device according to claim 6, wherein convex portions of the first irregularities function as a spacer for controlling a gap between the pair of substrates, and a metallic film is formed on the second irregularities, and the second irregularities and the metallic film together function as a reflection plate.

9. The liquid crystal display device according to claim 6, wherein the first irregularities are formed as a regularly repeated group of plural linearly extending steps having different heights, so that the plural steps having different heights provide the display medium layer with a plurality of areas having different thicknesses, and a metallic film is formed on the second irregularities, and the second irregularities and the metallic film together function as a reflection plate.

10. The liquid crystal display device according to claim 9, wherein, among the plural steps of the first irregularities, highest steps function as a spacer for controlling a gap between the pair of substrates.

11. The liquid crystal display device according to claim 6, wherein the first irregularities have convex portions corresponding to pixel regions, and the convex portions function as a shielding element for shielding light having a wavelength of 400 nm or less, and a metallic film is formed on the second irregularities, and the second irregularities and the metallic film together function as a reflection plate.

12. The liquid crystal display device according to claim 6, wherein the plastic substrate having the first and second irregularities includes a polarizing plate.

13. The liquid crystal display device according to claim 6, wherein the display medium layer includes polymer walls substantially surrounding liquid crystal regions.

14. The liquid crystal display device according to claim 13, wherein the polymer walls have birefringence.

15. A method for manufacturing a liquid crystal display device including a display medium layer including at least a liquid crystal material sandwiched between a pair of substrates, at least one of the substrates being a plastic substrate having first irregularities on a surface facing the display medium layer, and a plurality of polymer walls of a photocurable resin being formed in the display medium layer, the method comprising the steps of:

forming the first irregularities as a plurality of convex portions on one of the pair of substrates continuously from a surface of the substrate;

opposing the pair of substrates with the first irregularities facing the other substrate;

injecting a material for the display medium layer including at least a liquid crystal material, a photocurable resin and a photoinitiator into a gap between the pair of substrates; and causing phase separation between the liquid crystal material and the photocurable resin by irradiating the material for the display medium layer, wherein the first irregularities function as a spacer, and wherein the first irregularities are formed as stripe-shaped convex portions in areas excluding pixel regions, and the plurality of polymer walls of the photocurable resin are disposed in areas excluding the pixel regions and extend in a direction perpendicular to the stripe-shaped convex portions of the first irregularities.

16. A method for manufacturing a liquid crystal display device including a display medium layer including at least liquid crystal material sandwiched between a pair of substrates, at least one of the substrates being a plastic substrate, the method comprising the steps of:

forming the plastic substrate so as to have first irregularities on one surface and second irregularities on the other surface;

forming the display medium layer between the pair of substrates after opposing the substrates against each other and providing the irregularities on at least one surface of the plastic substrate with an optical function.

17. The method for manufacturing a liquid crystal display device according to claim 16, wherein the first irregularities and the second irregularities are formed on the plastic substrate by an embossing process.

18. The method for manufacturing a liquid crystal display device according to claim 16, wherein the first irregularities and the second irregularities are simultaneously formed on the plastic substrate.

19. The method for manufacturing a liquid crystal display device according to claim 16, wherein the step of forming the display medium layer includes a step of injecting a mixture including at least a liquid crystal material, a photocurable resin and a photoinitiator into a gap between the substrates and a step of irradiating the mixture through one of the substrates with light having a two-dimensional intensity distribution to cause phase separation between the liquid crystal material and the photocurable resin.

20. The method for manufacturing a liquid crystal display device according to claim 19, wherein the step of irradiating the mixture with the light having the two-dimensional intensity distribution is a step of irradiating the mixture through the plastic substrate with light having a uniform intensity distribution, and the uniform intensity distribution is changed into the two-dimensional intensity distribution by the second irregularities.

21. The method for manufacturing a liquid crystal display device according to claim 17, wherein the step of forming the plastic substrate includes a step of separating the plastic substrate from a large substrate material along concave portions of the second irregularities.

22. The method for manufacturing a liquid crystal display device according to claim 17, wherein the second irregularities have at least one through hole, and the method further comprises a step of injecting a material for the display medium layer through the through hole.

23. The method of claim 16, wherein the optical function is that of a reflective plate, an antireflective film, a photomask for shielding light in a predetermined wavelength range, or a color reproduction property of a color filter.

* * * * *